(12) United States Patent
Maugars et al.

(10) Patent No.: US 8,238,823 B2
(45) Date of Patent: Aug. 7, 2012

(54) METHOD FOR ENSURING A SECURE NFC FUNCTIONALITY OF A WIRELESS MOBILE COMMUNICATION DEVICE AND WIRELESS MOBILE COMMUNICATION DEVICE HAVING A SECURE NFC FUNCTIONALITY

(75) Inventors: Phillipe Maugars, Ranes (FR); Patrice Gamand, Douvres la Delivrande (FR)

(73) Assignee: NXP B.V., Eindhoven (NL)

( * ) Notice: Subject to any disclaimer, the term of this patent is extended or adjusted under 35 U.S.C. 154(b) by 729 days.

(21) Appl. No.: 11/815,767

(22) PCT Filed: Feb. 2, 2006

(86) PCT No.: PCT/IB2006/050351
§ 371 (c)(1),
(2), (4) Date: Aug. 7, 2007

(87) PCT Pub. No.: WO2006/085246
PCT Pub. Date: Aug. 17, 2006

(65) Prior Publication Data
US 2008/0188178 A1 Aug. 7, 2008

(30) Foreign Application Priority Data
Feb. 9, 2005 (EP) .................................... 05300106

(51) Int. Cl.
*H04B 5/00* (2006.01)
(52) U.S. Cl. ...................................... 455/41.1; 455/41.2
(58) Field of Classification Search ................. 455/41.1, 455/41.2
See application file for complete search history.

(56) References Cited

U.S. PATENT DOCUMENTS

| 4,908,523 | A | | 3/1990 | Snowden et al. |
| 5,300,875 | A | * | 4/1994 | Tuttle ............................ 320/138 |
| 5,359,279 | A | * | 10/1994 | Gidon et al. ................... 323/282 |
| 5,610,496 | A | | 3/1997 | Hofbauer et al. |
| 6,469,472 | B1 | * | 10/2002 | Aoshima et al. ............... 320/122 |
| 6,476,585 | B1 | * | 11/2002 | Simmonds ..................... 320/162 |
| 7,554,383 | B2 | | 6/2009 | Arisawa et al. |
| 2003/0017804 | A1 | * | 1/2003 | Heinrich et al. ................. 455/41 |
| 2003/0098355 | A1 | * | 5/2003 | Johnson ......................... 235/492 |
| 2003/0146821 | A1 | * | 8/2003 | Brandt ......................... 340/10.1 |
| 2003/0231106 | A1 | * | 12/2003 | Shafer ........................ 340/10.34 |
| 2004/0080299 | A1 | | 4/2004 | Forster et al. |

(Continued)

FOREIGN PATENT DOCUMENTS
WO    WO 00/41334 A    7/2000

*Primary Examiner* — Edward Urban
*Assistant Examiner* — Erica Fleming-Hall

(57) ABSTRACT

The invention provides a method for ensuring a secure NFC functionality of a wireless mobile communication device comprising the steps of detecting the charge state of a first energy source (1) which supplies the voltage for operating the wireless mobile communication device (S1); switching off the first energy source and switching on a second energy source (2), if the detected charge state of the first energy source (1) falls below a threshold (S2); detecting the charge state of the second energy source (2), if an external NFC signal is received (S3); charging of the second energy source via voltage induced by a received NFC signal to allow at least one secure NFC transaction, if the detected charge state of the second energy source (2) is below a threshold (S4). Furthermore the invention provides a wireless mobile communication device having a secure NFC functionality, which is always ready for operation of at least the secure NFC functionality.

20 Claims, 2 Drawing Sheets

U.S. PATENT DOCUMENTS

| | | | |
|---|---|---|---|
| 2004/0108835 A1* | 6/2004 | Kim et al. | 320/125 |
| 2004/0145342 A1* | 7/2004 | Lyon | 320/108 |
| 2004/0158296 A1* | 8/2004 | Greatbatch et al. | 607/34 |
| 2004/0210980 A1* | 10/2004 | Cacioli et al. | 2/159 |
| 2005/0077866 A1* | 4/2005 | Killian et al. | 320/103 |
| 2005/0194317 A1* | 9/2005 | Ikeyama et al. | 210/652 |
| 2005/0237844 A1* | 10/2005 | Hyde | 365/228 |
| 2006/0076922 A1* | 4/2006 | Cheng et al. | 320/108 |
| 2006/0145660 A1* | 7/2006 | Black et al. | 320/108 |
| 2006/0259098 A1* | 11/2006 | Erickson | 607/61 |

\* cited by examiner

METHOD FOR ENSURING A SECURE NFC FUNCTIONALITY OF A WIRELESS MOBILE COMMUNICATION DEVICE AND WIRELESS MOBILE COMMUNICATION DEVICE HAVING A SECURE NFC FUNCTIONALITY

FIELD OF THE INVENTION

The invention relates to a method for ensuring a NFC functionality of a wireless mobile communication device.

The invention also relates to a wireless mobile communication device having a secure NFC functionality operated by such a method.

BACKGROUND OF THE INVENTION

Involving from a combination of contactless identification and networking technologies, near field communication (NFC) is a wireless connectivity technology that enables convenient short-range communication between electronic devices. NFC is a very short-range wireless technology, for distances measured in centimeters, and is optimized for intuitive, easy and secure communication between various devices without user configuration. In order to make two devices communicate, users bring them close together or even make them touch. The devices' NFC interfaces will automatically connect and configure themselves to form a peer to peer network.

A further application of NFC is the combination of NFC applications with smart cart security concept so that devices act like contactless smart cart with cryptographic capabilities. This NFC technology can be denoted as secure NFC and is standardized in ISO 18092, ECMA 340 and ECGS 102190. NFC is also compatible to the broadly established contactless smart card infrastructure based on ISO 14443A.

The secure NFC can be included in wireless mobile communication devices like mobile phones, PDAs and the like. This means that confidential data and data that represents values is stored in a secure memory area and always stays on the mobile communication device. An authentication is performed by the secure NFC functionality included, for example, in a PDA or mobile phone and transmitted data can be encrypted by the secure NFC functionality using a private encryption key stored on the mobile phone.

The implementation of the secure NFC functionality into a wireless mobile communication device like a mobile phone allows the application of the mobile phone as for example a virtual stored transport ticket or an access key to a building (home or office), wherein the ticket or the access key is transferred by the secure NFC functionality of the mobile phone for granting the access to a transport means or a building.

However, wireless mobile communication devices have to be equipped with autonomous energy sources due to their mobile character. Such energy sources are usually batteries or accumulators, which can be recharged. Hence, it is conceivable that the readiness of operation of the wireless mobile communication device is not always guaranteed as the battery or the accumulator is unloaded by the time. Therefore, it is possible that the NFC functionality of the mobile phone is not available if needed. This, of course, creates problems for a user when he needs to transfer ticket data or access data via secure NFC in order to get an access to a building, a train or train station, a laboratory room, etc.

OBJECT AND SUMMARY OF THE INVENTION

It is an object of the invention to provide a method defined in the first paragraph and a wireless mobile communication device as defined in the second paragraph, in which the disadvantages defined above are avoided.

In order to achieve the object defined above with a method for ensuring a secure NFC functionality of a wireless mobile communication device according to the invention characteristic features are provided so that a system according to the invention is characterized defined below that is:

Method for ensuring a NFC functionality of a wireless mobile communication device comprising the steps of detecting the charge state of a first energy source which supplies the voltage for operating the wireless mobile communication device;

switching off the first energy source and switching on a second energy source, if the detected charge state of the first energy source falls below a threshold;

detecting the charge state of the second energy source, if an external NFC signal is received; and charging of the second energy source via voltage induced by a received NFC signal to allow at least one NFC transaction, if the detected charge state of the second energy source is below a threshold.

In order to achieve the object defined above with a wireless mobile communication device having secure NFC functionality according to the invention characteristic features are provided so that a device according to the invention can be characterized in the way defined below that is:

Wireless mobile communication device having a NFC functionality comprising antenna means adapted to receive and send NFC signals;

an NFC circuit adapted to provide a secure NFC functionality for the wireless mobile communication device;

a first energy source adapted to supply power for the wireless mobile communication device;

a second energy source connectable to the NFC circuit to supply power thereto;

control means adapted to monitor the charge state of the first energy source and adapted to switch off the first energy source and to switch on to the second energy source if the monitored charge state of the first energy source falls below a threshold;

detecting means adapted to detect the charge state of the second energy source; and wherein the second energy source is adapted to be charged via voltage induced by an external NFC signal received by the antenna means if the detected charge state the second energy source is not sufficient to allow at least one NFC transaction.

The characteristic features according to the invention provide the advantage that a wireless mobile communication device having NFC functionality is always ready to operate with respect to at least the NFC functionality. Hence, the method of operating a wireless mobile communication device having a NFC functionality and the wireless mobile communication device broadens the application scope of wireless mobile communication devices to areas with security or control demands such as ticket control systems or room access systems.

The measures as claimed in claim 2 and claim 5 provide the advantage of an additionally loading of the main power supply of the wireless mobile communication device while performing a NFC transaction.

The measures as claimed in claim 3 provides the advantage of an enhanced operational readiness of the wireless mobile communication device with respect to the secure NFC functionality.

The measures as claimed in claim 6 provide the advantage of an fast achievable ready to use state of the wireless mobile communication device with respect to the (secure) NFC functionality.

The measures as claimed in claim 7 provide the advantage of an effective implementation of the second energy source, which can be manufactured at low costs.

The aspects defined above and further aspects of the invention are apparent from the examples of embodiment to be described hereinafter and are explained with reference to the examples to embodiment. The invention will be described in more detail hereinafter with reference to the examples of embodiment but to which the invention is not limited.

DESCRIPTION OF EMBODIMENTS

It has to be appreciated that if, in connection with this invention, it is referred to NFC, any short-range wireless communication technology is encompassed which is not necessarily using the standardized NFC. Hence, the secure NFC functionality according to this invention is to be understood to encompass various protocols and ID types and not only RFID.

Figure 1:
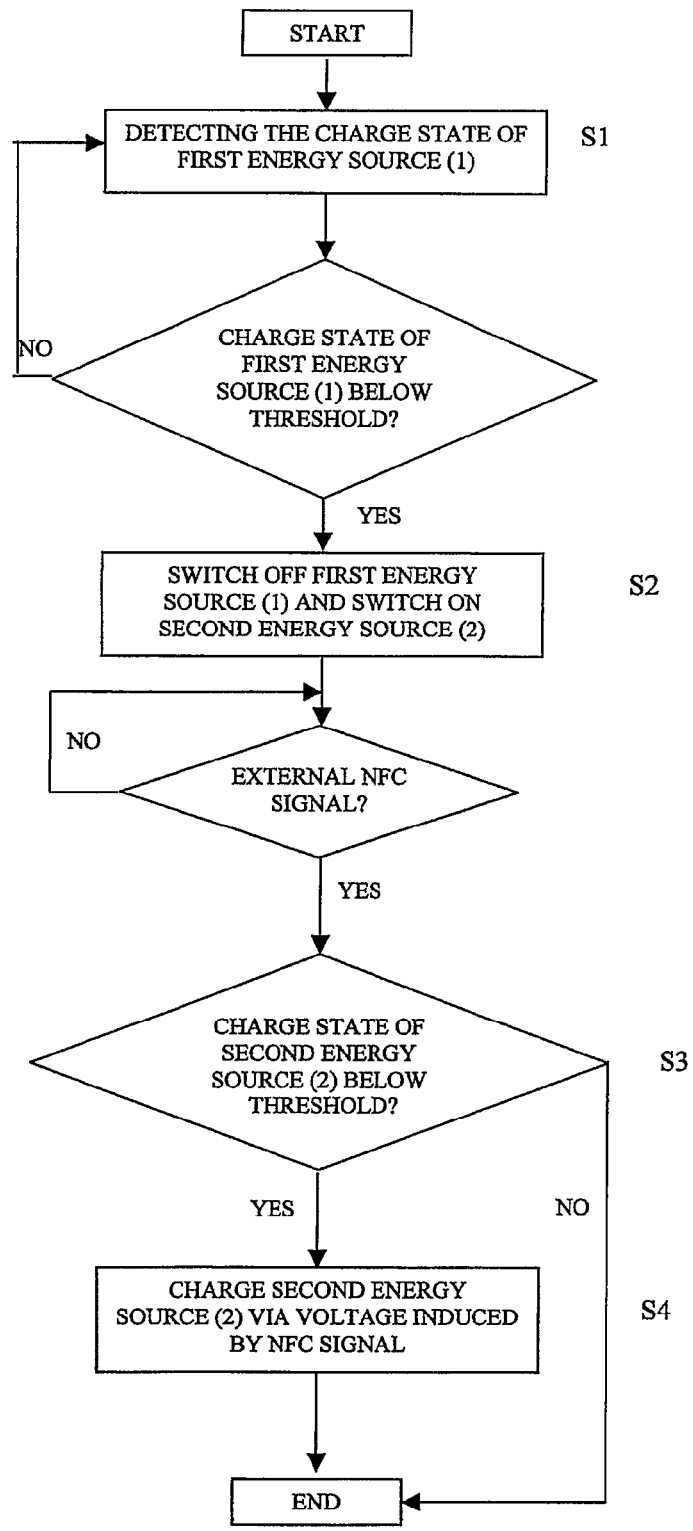
FIG. 1 shows the basic concept of the invention in form of a schematic flow diagram.

Referring to FIG. 1, a method for ensuring a secure NFC functionality of a wireless mobile communication device according to a first embodiment is described. The method starts with the step S1 of detecting the charge state of a first energy source 1 with supplies the voltage for operating the wireless mobile communication device. The detecting could be included in a monitoring of the first energy source, which could be performed by a power management unit (PMU). The detected charge state of the first energy source (1), for example a main battery, is then compared with a predetermined threshold.

If the detected charge state of the first energy source 1 falls below a threshold, then the first energy source 1 is switched off. The threshold is preferably defined as a charge state value of the main battery, which is not able to maintain the overall operation of the wireless mobile communication device. However, the threshold could also be defined according to a stand-by condition. In addition, after switching off the first energy source, a second energy source 2 is switched on for maintaining at least the NFC functionality of the wireless mobile communication device. This switching step is denoted with S2.

If the wireless mobile communication device having a secure NFC functionality receives an external NFC signal, for example, a request of a RFID reader to send an ID, the charge state of the second energy source 2 is detected. This step is denoted with S3.

If the detected charge state of the second energy source 2 is below a threshold the second energy source (2) is charged via a voltage induced by the external NFC signal. The threshold is preferably defined as a charge state value necessary for allowing at least one NFC transaction to answer the NFC signal. However, the threshold could also set to a value that corresponds to more than one NFC transaction. A NFC transaction within the meaning of the invention is at least a pair of an external NFC signal and a corresponding NFC answer signal of the device. The charging step is denoted with S4.

By this method the secure NFC functionality can be ensured or maintained even if the first energy source with the necessary operating voltage has been discharged as the power supply of the device is switched to a second energy source which supplies at least the NFC circuit of the device with power. Since the second energy source need not to be charged beforehand as it can be charged by the voltage induced by an external NFC signal initiating a NFC transaction, the NFC functionality is always available even if the second energy source has been discharged over the time, for example by a leak current, and the first energy source is switched off because of a discharged state. Hence, the NFC functionality of the wireless mobile communication is always ensured and no unexpected problems are created for a user if he needs to use the secure NFC functionality of the wireless mobile communication device.

The method can be advantageously extended in that way that the step of charging the second energy source 2 is continued even, if the second energy source 2 is completely loaded, by switching the charging operation from the second energy source to the first energy source which is then at least partially reloaded via the voltage induced by a NFC signal received by the wireless mobile communication device. For example in a case, where the user of a wireless communication device having a secure NFC functionality which allows him access to a secure area of a building, the user is able to get access to the house since the secure NFC functionality is maintained even if the main battery (i.e. first energy source) of the wireless mobile communication device has been switched off because of a too low charge state. However, the user is not only granted access to the building by just bringing his wireless mobile device in the vicinity (i.e. the near field) of a RFID reader and initiating a NFC transaction but he can also at least partially reload the main battery of the wireless mobile communication device as long as he remains in the receiving range of the RFID reader signal. Of course, as the energy density of the NFC signal can not be made too high in order not too harm the health of the user, a complete reloading of the main battery will take a long time compared with the quick charging of the second energy source.

It has to be appreciated that the method of the invention is not limited to RFID readers and RFID signals since almost every kind of energy-bearing signal can be used for a short-range communication as long as the wireless mobile communication device is adapted to use the received energy for charging the second energy source.

Figure 2:
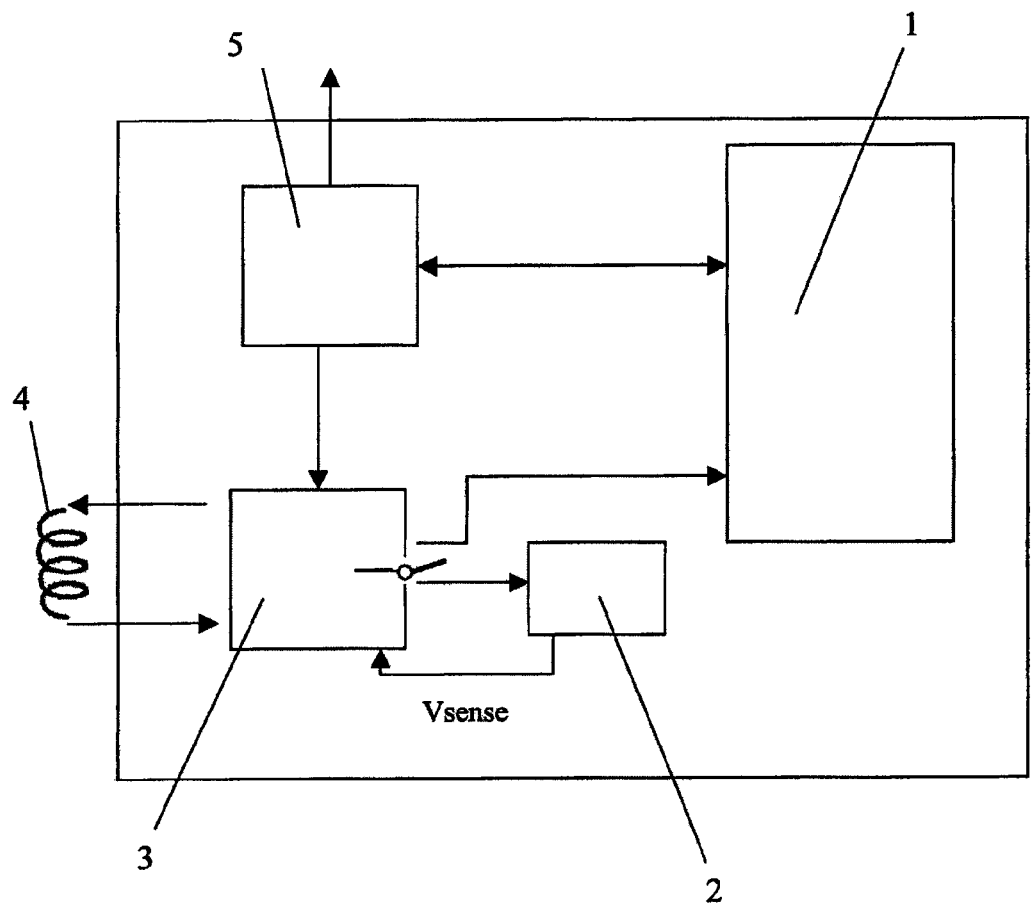
FIG. 2 shows a wireless mobile communication device according to an embodiment to the invention in form of a block diagram.

Referring to FIG. 2, an embodiment of a wireless mobile communication device having a secure NFC functionality according to the invention is illustrated in form of a block diagram. The wireless mobile communication device comprises a first energy source 1 which can be any usual battery or accumulator. In this embodiment, the first energy source 1 is a rechargeable main battery, which supplies the operating voltage for all components wireless mobile communication device including a NFC circuit 3, which provides the NFC functionality. The wireless mobile communication device further comprises antenna means 4 for receiving and sending NFC signals. NFC signals to be sent are generated in the NFC circuit 3 and external NFC signals like RFID requests are received by the antenna means and forwarded to the NFC circuit. The NFC circuit of this embodiment is adapted for RFID signals; however, other signal protocols could be used as well.

The wireless mobile communication device further comprises control means 5 which are adapted to detect the charge state of the main battery 1. Furthermore, the control means are adapted to control distribution of the operating voltage supplied by the main battery to the NFC circuit as well as to the other components of the wireless mobile communication device. In this embodiment, the control means are embodied as a power management unit (PMU) chip.

The wireless mobile communication device further comprises a second energy source 2, which is connectable to the NFC circuit 3 by switching means to supply power to the NFC circuit 3 for performing the secure NFC functionality. The second energy source 2 is preferably an integrated micro battery and can be realized on the passive companion chip of the NFC circuit also used for antenna adaptation and supply decoupling. Preferably, the integrated micro battery is embedded with an integrated silicon technology as PICS technology for instance. This battery technology by solid-state electrolyte deposition in silicon for the integrated micro battery can be manufactured by very low additional costs when using trench capacitive process as in PICS process.

In a preferred embodiment, the micro battery can be charged at the time of power up of the wireless mobile communication device so that the secure NFC functionality is immediately available if the main battery is switched off due to a too low charge state or operation voltage, respectively.

However, if the integrated micro battery is not loaded, the micro battery is adapted to be charged by a current that is delivered by the NFC circuit according to a voltage induced by a received NFC signal. As an integrated micro battery can be charged in a very short time, the delay in receiving the RFID signal request and answering it will be almost unnoticeable for the user.

Detection of the charge state of the integrated micro battery can be either achieved by the control means 5 which are for example a power management unit (PMU) or with the NFC circuit 3. In this embodiment, the charge state of the integrated micro-battery 2 can be detected via a detection line signal Vsense connected to the NFC circuit 3.

The wireless mobile communication device having a secure NFC functionality according to this embodiment is always ready for operation with respect to the secure NFC functionality even if the main battery 1 has been switched off and the integrated micro battery 2 is not sufficiently charged.

In a further embodiment of the wireless communication device according to the invention, switching means are provided, preferably integrated in the NFC circuit 3, which enables the main battery 1 to be charged by voltage induced by received NFC signals for reloading if switched off due to a too low charge state. However, a complete reload of the main battery takes a very long time as the capacity of the main battery 1 is much higher than the capacity of the integrated micro battery and the energy density of the NFC signal is rather low as mentioned above. Since a RFID transaction needs approximately 100 mA/200 ms, the capacity of the micro battery 2 need not to be as big as the capacity of the main battery since it only supplies the NFC circuit with power. Furthermore, a micro battery preferably has a very fast recharging characteristic so as to not cause any noticeable delay in performing a NFC transaction.

It has to be appreciated that the concept of the invention can also be applied to other protocols than NFC. For example, a short message transmission via GSM protocol is also conceivable. In fact, any short-range communication protocol which is able to deliver a energy-bearing signal sufficient for inducing a voltage that is able to be used for charging the second energy source up to a level which allows at least one secure NFC transaction can be used. The term NFC therefore has not to be interpreted to limit the scope of the claims to the NFC standard functionality as such, but for all kind of RFID functionalities for networking technologies.

It has to be appreciated that the reference signs within the claims are only given for illustrative purpose and shall not be construed as limiting the scope of the method for which protection is sought after.

The invention claimed is:

1. A method of ensuring a Near Field Communication (NFC) functionality of a wireless mobile communication device, the method comprising:
   detecting a charge state of a first energy source which supplies a voltage for operating the wireless mobile communication device;
   switching off the first energy source and switching on a second energy source, if the detected charge state of the first energy source falls below a first threshold;
   detecting a charge state of the second energy source that maintains at least the NFC functionality of the wireless mobile communication device, when the wireless mobile communication device receives an external NFC signal; and
   charging the second energy source via voltage induced by the received external NFC signal to perform at least one NFC transaction, if the detected charge state of the second energy source is below a second threshold.

2. The method according to claim 1, further comprising:
   charging the first energy source via the voltage induced by the received external NFC signal after the second energy source is completely charged.

3. The method according to claim 1, further comprising:
   pre-charging the second energy source at the time of power-up of the wireless mobile communication device so as to maintain the NFC functionality when the first energy source has been switched off or has insufficient voltage to operate the wireless mobile communication device.

4. A wireless mobile communication device having a Near Field Communication (NFC) functionality comprising:
   an antenna means that receives and sends NFC signals;
   a NFC circuit that provides a NFC functionality for the wireless mobile communication device;
   a first energy source that supplies power to the wireless mobile communication device;
   a second energy source that supplies power to the NFC circuit to maintain at least the NFC functionality of the wireless mobile communication device;
   a control means that monitors the charge state of the first energy source, switches off the first energy source, and switches on to the second energy source if the monitored charge state of the first energy source falls below a threshold;
   a detecting means that detects the charge state of the second energy source, wherein voltage induced by an external NFC signal received by the antenna means charges the second energy source if the detected charge state the second energy source is not sufficient to allow at least one NFC transaction.

5. The wireless mobile communication device according to claim 4, further comprising:
   switching means to switch the charging operation via voltage induced by an external NFC signal from the second energy source to the first energy source after the second energy source is completely charged.

6. The wireless mobile communication device according to claim 4, wherein the second energy source has a sufficiently fast recharging characteristic that the at least one NFC transaction is performed without a noticeable delay after charging the second energy source fit is faster chargeable than the first energy source.

7. The wireless mobile communication device according to claim 4, wherein the second energy source is an integrated micro battery having sufficient capacity to power a NFC circuit.

8. The method according to claim 1, wherein the first threshold is defined as the charge state of the first energy source.

9. The method according to claim 1, wherein the first threshold is defined according to a stand-by condition.

10. The method according to claim 1, wherein the second threshold is a charge state value necessary for allowing the at least one NFC transaction to answer the received external NFC signal.

11. The method according to claim 1, wherein the second threshold is a charge state value necessary to perform more than one NFC transaction, wherein each NFC transaction comprises at least a pair of the received external NFC signal and a corresponding NFC answer signal.

12. The wireless mobile communication device according to claim 4, wherein the control means is a power management unit (PMU) chip.

13. The wireless mobile communication device according to claim 4, wherein the second energy source is located on a passive companion chip.

14. The wireless mobile communication device according to claim 13, wherein the passive companion chip also performs antenna adaptation and supply decoupling.

15. The wireless mobile communication device according to claim 7, wherein Power Integrated Circuit (PIC) technology is used to fabricate the integrated micro battery.

16. The wireless mobile communication device according to claim 4, wherein a power management unit (PMU) detects the charge state of the second energy source.

17. The wireless mobile communication device according to claim 4, wherein a detection line signal (Vsense) indicates the charge state of the second energy source.

18. The wireless mobile communication device according to claim 4, wherein the first energy source has a much larger capacity than the second energy source.

19. The wireless mobile communication device according to claim 18, wherein fully recharging the first energy source takes much more time than fully recharging the second energy source.

20. The wireless mobile communication device according to claim 4, wherein the second energy source only supplies power to the NFC circuit.

* * * * *